Sept. 11, 1951 A. VARGA 2,567,863
MAGNETIC COUPLING DEVICE
Filed Sept. 15, 1948 3 Sheets-Sheet 1
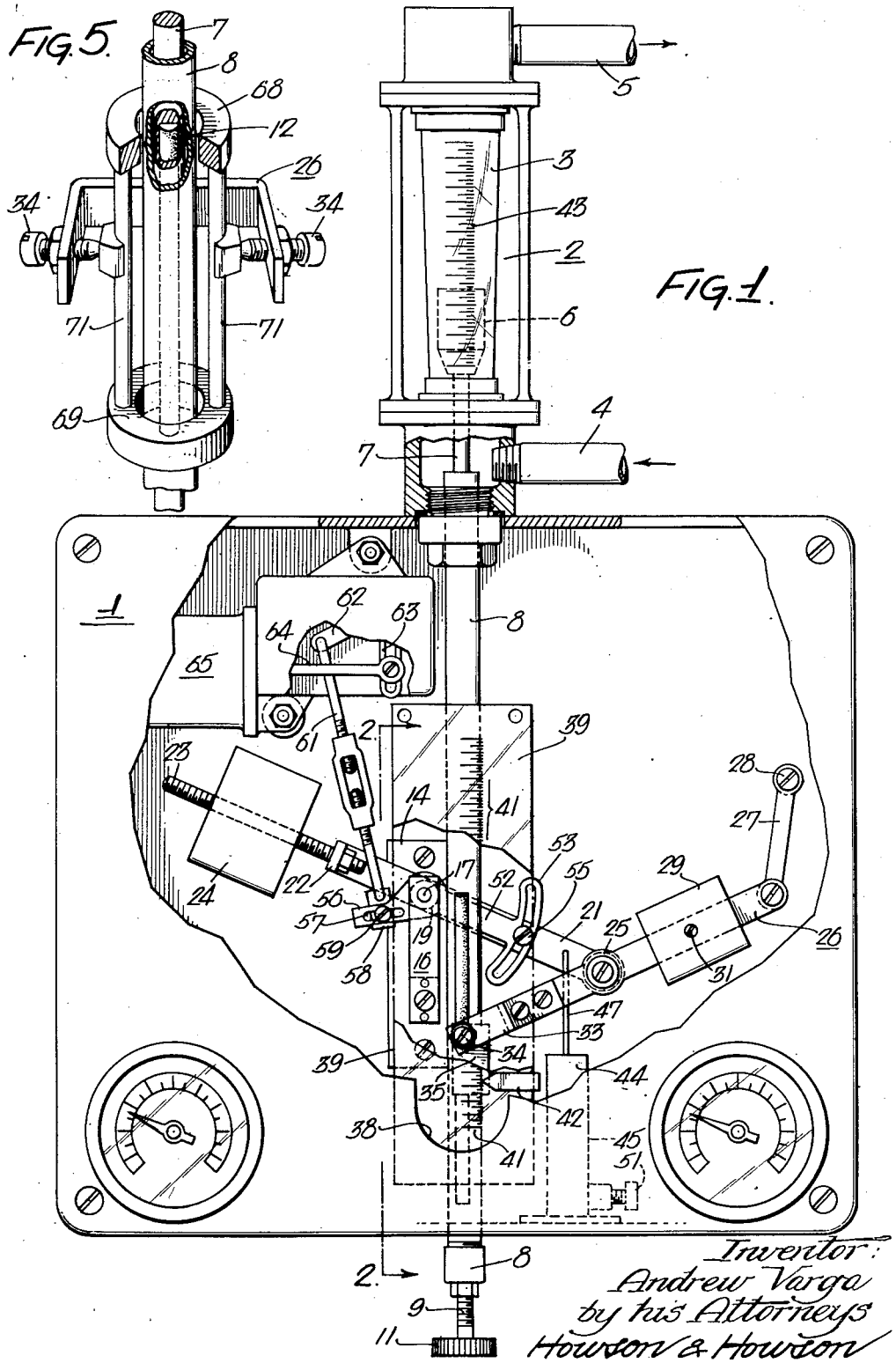
Inventor:
Andrew Varga
by his Attorneys
Howson & Howson Sept. 11, 1951  A. VARGA  2,567,863
MAGNETIC COUPLING DEVICE
Filed Sept. 15, 1948  3 Sheets-Sheet 2
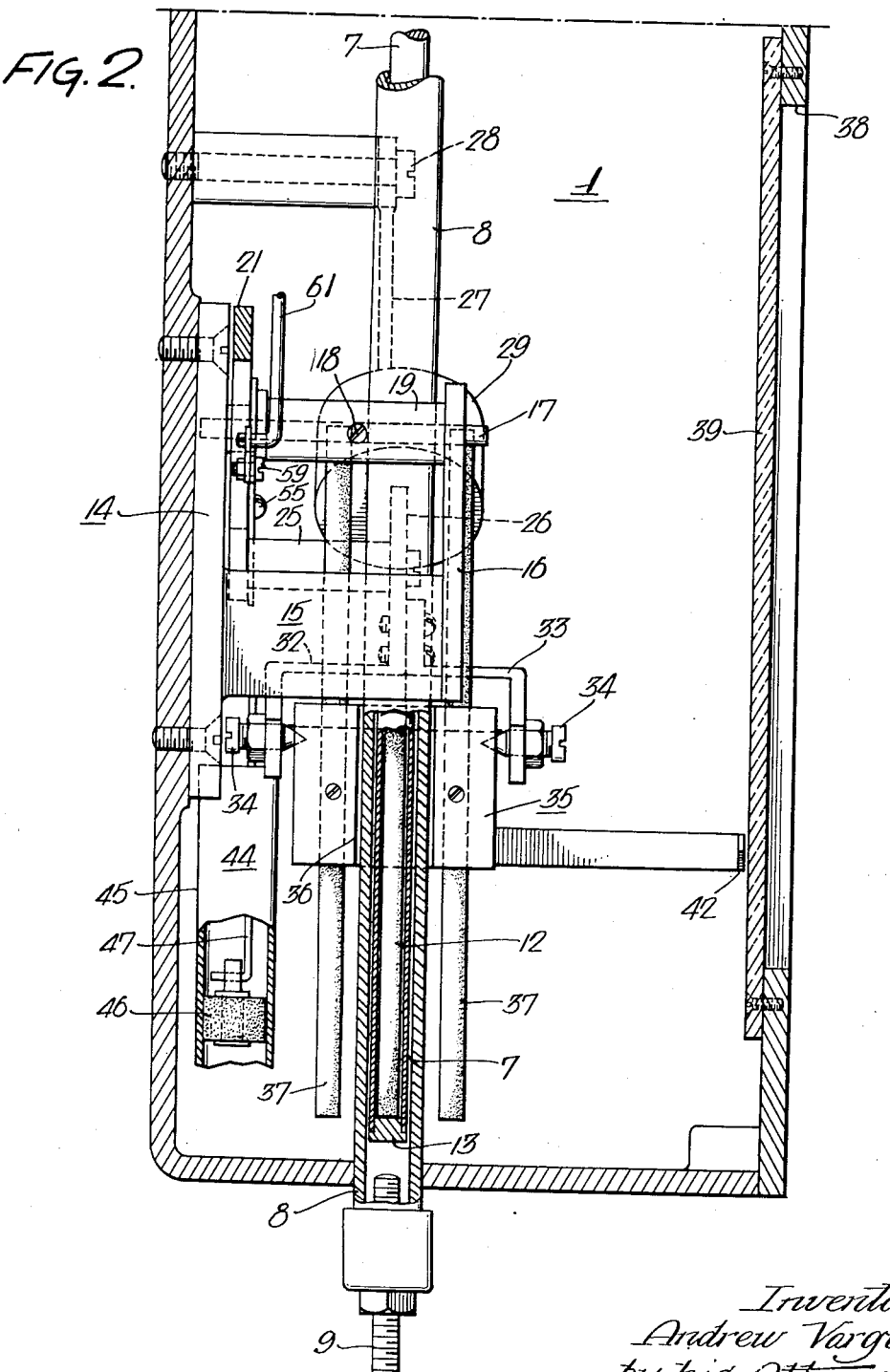
Inventor:
Andrew Varga
by his Attorneys
Howson & Howson Sept. 11, 1951      A. VARGA      2,567,863
MAGNETIC COUPLING DEVICE
Filed Sept. 15, 1948      3 Sheets—Sheet 3
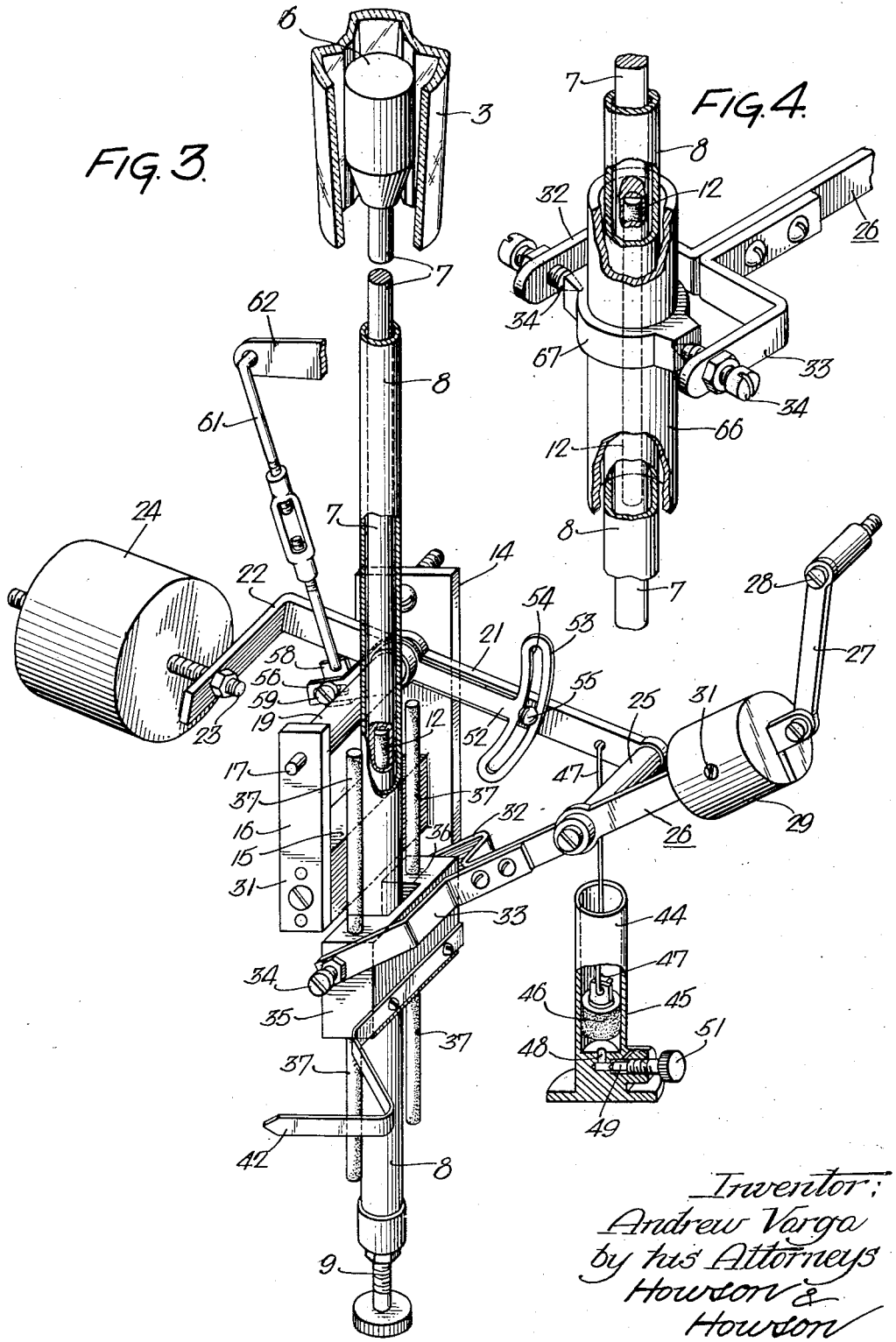
Inventor;
Andrew Varga
by his Attorneys
Howson &
Howson Patented Sept. 11, 1951

2,567,863

UNITED STATES PATENT OFFICE 2,567,863

MAGNETIC COUPLING DEVICE

Andrew Varga, Philadelphia, Pa., assignor to Schutte and Koerting Company, Philadelphia, Pa., a corporation of Pennsylvania Application September 15, 1948, Serial No. 49,381

13 Claims. (Cl. 172—284)

1

This invention relates to improvements in magnetic coupling devices of a character adapted for use in flowmeters and like instruments as a medium for connecting the float or other movable element of the instrument to a suitable indicator either proximate to or remote from the meter installation.

A principal object of the invention is to provide a relatively simple and highly efficient magnetic coupling device having inherent ability to maintain the coupling intact under all conditions to which it might normally be subjected in the operation of the instrument with which it is associated.

Another object of the invention is to provide a magnetic coupling which reduces to a minimum the dead weight imposed upon the movable element of the meter with which the coupling is associated, thereby preserving the normal sensitivity of the instrument.

Still another object of the invention is to provide a magnetic coupling wherein the operative relation between the magnetically coupled elements remains substantially constant, and to this end the invention further contemplates an arrangement in which the said elements are free to move in rectilinear parallel paths.

The invention resides further in certain mechanical and structural details hereinafter set forth and illustrated in the attached drawings, wherein;

Fig. 1 is a front elevational and partial sectional view showing a magnetic coupling device made in accordance with the invention;

Fig. 2 is a sectional view on the line 2—2 Fig. 1;

Fig. 3 is a perspective view partly in section of the coupling assembly; and

Figs. 4 and 5 are fragmentary perspective views illustrating modifications within the scope of the invention.

The embodiment of the invention illustrated in the drawings comprises a casing 1 within which is housed the magnetic coupling assembly. In the present instance the casing constitutes a support for a flowmeter 2 which may be of conventional or other design, said meter including a flow tube 3 connected at the bottom with an inlet duct 4 and at the top with an outlet duct 5 and containing a float 6 the position of which within the tube is a factor, for example, of the velocity of the fluid passing through the latter.

Depending from the float 6 is a rod 7, and this rod passes downwardly through a cylindrical casing 8 which extends through the bottom of the casing 1. The sealed lower end of the casing 8 is provided with an adjusting screw 9, the inner end of which extends into the interior of the casing, as best illustrated in Fig. 2, and the outer end of the screw is provided with a knurled head

2

11 by means of which the screw may be turned in or out of the casing, as may be required. The iner end of the screw forms a stop for the lower end of the rod 7 and limits the extent of the downward movement of the rod in the casing 8.

As shown in Figs. 2 and 3 the lower end of the rod 7 is made hollow for reception of an elongated bar magnet 12. The lower open end of the rod 7 through which the magnet is inserted is normally closed by a plug 13 which seals the magnet chamber within the rod and holds the magnet immovably within the rod. It will be noted that the longitudinal axes of the rod and the magnet 12 coincide.

It will be apparent that with this arrangement the movements of the float 6 in the flowmeter tube 3 will be accompanied by a corresponding longitudinal movement of the rod 7 and of the magnet 12 in the cylindrical casing 8. It will be noted also that the upper end of the tubular casing 8 is positioned in the fluid channel of the meter 2 so that the rod 7 is entirely immersed in said fluid.

Mounted within the casing 1 is a bracket, the body of which is designated by the reference numeral 14, said bracket having a forwardly extending arm 15 to which is suitably secured a post 16 which parallels the said body. Journaled at its opposite ends in the body 14 and the post 16 respectively is a shaft 17 to which is secured by means of a set screw 18 (see Fig. 2) the cylindrical hub portion 19 of a lever 21. One end of this lever, which is thus pivotally supported in the bracket for angular movement about the axis of the shaft 17, has a forwardly turned terminal portion 22 in which is secured a threaded rod 23, said rod extending parallel to the body of the lever 21 and supporting a weight 24 which balances the opposite end of the lever 21 and associated elements as hereinafter described. The weight is threaded on the rod 23 for adjustment longitudinally of the latter. The opposite end of the lever 21 has a forwardly extending arm 25 to the outer end of which is pivotally secured a second lever 26. This lever is pivotally connected at its upper end to a link 27 and pivotally secured at 28 to the rear wall of the casing 1. The upper end of the lever 26 also carries a balance weight 29 which may be secured in adjusted position longitudinally of the lever by a set screw 31.

The lower end of the lever 26 is bifurcated as indicated at 32, 33, and each of the bifurcations has threaded therein a screw 34, these screws being in axial alignment with each other and having cone-shaped inner ends, as best shown in Fig. 2, which enter conical recesses in opposite sides of a block 35 and thereby pivotally support the block between the bifurcations 32, 33 of the lever 26. Since the supporting screws 34 engage the upper end of the block 35 the latter is supported in a depending position at the end of the lever 26.

As shown in Fig. 3, the block 35 has a central vertical recess 36 through which the casing 8 extends, and supported in the block 35 at each side of this recess is a rod magnet 37. The normal depending position of the block 35 in the bifurcations 32, 33 and the positions of the magnets 37, 37 within the block are such that the magnets are normally supported in position parallel to the magnet 12 within the rod 7 and uniformly spaced with respect to said magnet at the opposite sides of the latter. The normal relationship of the magnets is well shown in Fig. 3.

The front wall of the casing 1 has a slotted opening 38 closed by a glass plate 39 secured to the inner surface of said wall, as best shown in Fig. 2, said plate having a suitable scale 41 marked thereon for coaction with a pointer 42 secured to the block 35 as illustrated in Fig. 3. In this manner the exact position of the magnets 37 with respect to the magnet 12 may be determined, it being noted by reference to Fig. 1 that the tube 3 of the meter is provided with a scale 43 affording a direct reading of the position of the float 6 in the tube and, indirectly, of the position at any moment of the magnet 12.

It will be noted that with the arrangement described above and by reason of the magnetic coupling between the magnet 12 and the magnets 37, 37 the movements of the float 6 within the tube 3 will be accompanied by a corresponding movement of the said magnets 37 and the block 35 to which these magnets are secured. Such movement of the block 35 will cause a pivotal movement of the lever 26 about the pivotal connection of this lever with the link 27, and this movement of the lever 26 is precluded from changing the normal positional relationship, laterally, of the magnets 12 and 37 by reason of the pivotal connection of the lever 26 with the lever 21, which as a result of the movement of the lever 26 is turned about its relatively fixed pivot and constrains the end of the lever 26 which carries the block 35 to move in a rectilinear path parallel to the axis of the magnet 12. In other words, the link 27 and lever 21, in conjunction, guide the lever 26 so that its block supporting end moves in a rectilinear path parallel to the path of movement of the magnet 12. Thus the magnets 37 are not only free to move in paths parallel to the path of the magnet 12, but also cannot be diverted from such path. The magnets are also free to maintain their normal parallel relation through angular adjustment of the block 35 on the pivot pins 34, it being noted that the mode of suspension of the block on the pins tends to retain the magnets 37 parallel to the magnet 12 independently of the magnetic coupling.

The movements of the lever 21 are dampened in the present instance by a dashpot 44, shown in Fig. 3, which comprises a cylinder 45 and a plunger 46 connected by a rod 47 to the lever 21. A vent 48 is provided in the bottom of the cylinder 45 and the effective size of this vent is controllable by means of a valve 49 adjustable through a knurled head 51.

Means is provided for operatively connecting the lever 21 with a suitable indicator device remote from the flowmeter. Pivotally supported upon the hub 19 of the lever 21 is an arm 52 having a segmental slotted end portion 53. The slot 54 of this end portion is curved on an arc of a circle centered in the axis of the shaft 17 and a set screw 55 passes through the slot and is threaded into the lever 21 whereby the arm 52 may be secured to the lever 21 in the desired position of relative angular adjustment. The arm 52 has an extension 56 at the opposite side of the hub 19, said extension being longitudinally slotted as indicated at 57 in Fig. 1, and a flanged plate 58 is secured against the face of the extension 56 by means of a set screw 59 which passes through the slot 57 and is threaded into the plate 58. Secured in the plate 58 is the lower end of a turnbuckle link 61, the upper end of which is connected to an arm 62 of a bell crank lever, the other arm 63 of the lever being operatively connected through a link 64 with a transmission unit 65. This unit, in the present instance, constitutes one element of a transmission train connecting the bell crank lever 62, 63 with the remote indicator device mentioned above. The details of the indicator and of the transmission means form no part of the present invention and are therefore not illustrated.

The operation of the device will be apparent from the foregoing description. It will be noted that the device herein described is so constituted that the magnetic coupling is inherently incapable of being broken by sudden surges of liquid in the flowmeter stream and resultant relatively rapid displacement movements of the float 6 in the tube 3. Assuming, for example, that the north pole of the magnet 12 is at its upper end as viewed in the drawings, and the corresponding poles of the magnets 37 at their lower ends, the magnets are then magnetically coupled by attraction at both ends. If the actuating magnet 12 is suddenly moved upwardly at a rate tending to leave the magnets 37 and associated parts behind, the resulting approach of the south pole of the magnet 12 to the south poles of the magnets 37 will overcome the residual inertia and bring the magnets quickly to the normal coupled positions. The lengths of the magnets in relation to the maximum travel of the float 6 in the tube 3 effectively precludes a condition wherein the magnets are forced by mutual repulsion into uncoupled relation. It will be noted also that since the magnets 37 are substantially uniformly spaced with respect to the magnet 12 and are free to move in conformity to the movements of that magnet, as previously set forth, substantially no side thrust is exerted in any direction by the magnets 37 upon the magnet 12. This avoids objectionable frictional loading of the float assembly and permits said assembly to move with substantial freedom in the casing.

It will be apparent that the same functional characteristics can be had by use of more than two of the follower magnets arranged in uniformly spaced relation about the magnet 12. Similar characteristics are also obtainable by use of a single bar magnet of the hollow cylindrical form illustrated in Fig. 4. In this case the two magnets 37 of the earlier described embodiment are replaced by a single magnet 66 of cylindrical form, the latter being mounted on the lever 26, in essentially the same manner as the magnets 37, through the medium of a collar 67 which is attached to the magnet 66 preferably at a point above center of mass of the latter. The magnet 66 embraces the casing 8 and magnet 12 and is free to assume a position coaxial with the latter. The poles of the magnet 66 at the opposite ends of the magnet respectively, are in the same relation to the magnet 12 as those of the magnets 37.

Similar functional characteristics are also obtainable by use of magnets of a different form, as illustrated for example in Fig. 5. In this case the bar magnets 37 and 66 of the previously described embodiments are replaced by two magnets 68 and 69 of annular form united in axially spaced relation by non-magnetic elements 71 in the form in the present instance of two rods. The poles of each of the magnets 68 and 69 are on the inner and outer peripheries respectively, i. e., in one the north pole is on the inner circumferential portion and the south pole on the outer circumferential portion, and in the other magnet these positions of the poles are reversed. The magnets coaxially embrace the magnet 12 and are arranged with respect to the poles of that magnet so as to afford the desired coupling.

It will be apparent that plural magnets of annular or possibly other form might, without departure from the principle of the invention, be substituted also for the bar magnet 12 of the prime mover; and that the assembly as a whole is subject to modification within said principle as defined by the appended claims.

I claim:

1. In a magnetic coupling a pair of bar magnets arranged in magnetically coupled parallel relation, and transmission means including an element operatively connected to one of said magnets, said magnets being free for movements in parallel paths and in said parallel relation, said transmission element consisting of a floating lever with means for supporting the lever so that the point of connection thereof with the magnet is constrained to move in a path paralleling the path of movement of the first magnet.

2. In a magnetic coupling, a pair of longitudinally movable bar magnets arranged in parallel magnetically coupled relation, and transmission means operatively connected with one of said magnets, said transmission means including a lever pivotally connected at one end to the said magnet and having guide means constraining said one end to move in a path paralleling the path of movement of the other magnet.

3. A magnetic coupling according to claim 2 wherein the guide means includes a second lever pivotally connected to the first named lever and supported upon a relatively fixed pivot.

4. A magnetic coupling according to claim 3 wherein the second lever constitutes an active link in the transmission train.

5. A magnetic coupling according to claim 3 wherein the second lever is pivotally connected to the first lever at a point intermediate the ends of the latter, and wherein further the outer end of the first lever is supported for movement in a predetermined path.

6. In a magnetic coupling a pair of longitudinally movable bar magnets arranged in parallel magnetically coupled relation, transmission means operatively connected with one of said magnets, a lever pivotally connected at one end to one of said magnets, a second lever supported on a relatively fixed pivot and pivotally connected to the lever first named, means associated with the first lever for counter-balancing the weight of the magnet with respect to the point of pivotal connection between said levers, and means associated with the second lever for counter-balancing the weight of the first lever, the said magnet, and the first named counter-balancing means, with respect to said relatively fixed pivot.

7. A coupling according to claim 6 wherein the said levers constitute elements of a transmission train.

8. A coupling according to claim 6 wherein the first named lever has guide means cooperating with the second lever to hold the point of pivotal connection of the first lever with the magnet to movement in a predetermined path.

9. In a magnetic coupling a bar magnet, and a pair of bar magnets at opposite sides respectively of the first named magnet and in parallel magnetically coupled relation to the latter, said magnets being movable as a unit in parallel paths, the magnets of said pair being pivotally supported for self-adjustment into parallelinity with the first named magnet.

10. A magnetic coupling according to claim 9 wherein the magnets of said pair are free to move longitudinally with the other magnet but are constrained against translational movements in lateral direction.

11. In a magnetic coupling, a magnetic prime mover exhibiting spaced north and south poles and movable rectilinearly on a line intersecting both said poles, and a magnetic follower having north and south poles magnetically coupled respectively to the south and north poles of said prime mover and free for movement on a line parallel to the line of movement of said prime mover, the prime mover being in the form of a bar magnet with the opposite poles at the extremities thereof, and the follower consisting of a hollow cylindrical magnet also with the opposite poles at the extremities thereof and embracing and coaxial with the prime mover.

12. In a magnetic coupling, a magnetic prime mover exhibiting spaced north and south poles and movable rectilinearly on a line intersecting both poles, and a magnetic follower having north and south poles magnetically coupled respectively to the south and north poles of said prime mover and free for movement on a line parallel to the line of movement of said prime mover, the prime mover comprising a bar magnet and the follower comprising a plurality of annular magnets rigidly connected and presenting opposite poles to the respective poles of the bar magnet.

13. A magnetic coupling according to claim 12 wherein the follower comprises rigidly connected annular magnets embracing and presenting annular opposite poles to the respective magnetic poles of the prime mover.

ANDREW VARGA.

REFERENCES CITED

The following references are of record in the file of this patent:

UNITED STATES PATENTS

| Number | Name | Date |
|---|---|---|
| 716,110 | Rose | Dec. 16, 1902 |
| 2,182,469 | Davis | Dec. 5, 1939 |
| 2,347,861 | Winton | May 2, 1944 |
| 2,380,399 | Bowie | July 31, 1945 |
| 2,425,691 | Brewer | Aug. 12, 1947 |
| 2,458,759 | Abell | Jan. 11, 1949 |
| 2,475,630 | Melas | July 12, 1949 |

FOREIGN PATENTS

| Number | Country | Date |
|---|---|---|
| 20,418 | Great Britain | of 1892 |
| 373,380 | Italy | July 25, 1939 |